Reissued Dec. 11, 1934

Re. 19,396

UNITED STATES PATENT OFFICE 19,396

FOUNDRY FACING AND METHOD OF MAKING SAME

Benjamin F. Wallace, Brooklyn, N. Y.

No Drawing. Original No. 1,787,964, dated January 6, 1931, Serial No. 326,905, December 18, 1928. Application for reissue January 4, 1933, Serial No. 650,135

12 Claims. (Cl. 22—189)

This invention relates to the casting of metals in sand molds and has for its particular objects the efficient production from sand molds, without any cutting, washing or rat-tailing or hard spotting action occurring, of castings having smooth, fine-grained surfaces, free from pits, pin holes and blow-holes, as well as being completely devoid of burnt-in-sand or fused silica skins and from which the adhering sand is readily peeled thus requiring but a minimum of brushing and tumbling or milling operations, whereby such castings, because of the clean condition of their surfaces, are especially suitable for the reception of enamel coatings and for galvanizing and nickeling without necessitating the pickling thereof.

As is well known in the foundry art, the employment of a troweled or brushed layer of refractory, nonoxidizing facing materials, such as graphite, for example, will serve to fill up or slick over the surface voids, without however sealing the surface against the escape of the steam and gases and will serve as a refractory, protective layer against the fusing or cutting action of the molten metal on the sand of the mold, thereby facilitating the peeling of the sand from the casting. The employment of graphite or plumbago as a facing material for sand molds in foundry operations has, however, presented many problems and up to the present time is generally limited to the production of heavy, thick, castings of large superficial area that must be manually cleaned after having been shaken out of the mold since, because of their size, they do not lend themselves to mechanical cleaning by milling and tumbling operations. For example, in producing such thick, heavy castings it has been customary to resort to a slicking operation whereby through the employment of a spoonlike tool, the facing is worked into the interstices of the damp sand surface of the finished mold, but at the same time this operation served to partially seal the voids or interstices of the sand surface through the positive movement of the sand particles under the trowelling action of the tool and often results in the tool marks showing on the finished castings. Among the other drawbacks to such slicking operations are the expense due to the extra time required on the part of the skilled molder, as well as the delay in production, the difficulty in producing pattern-true castings, especially where the surface is of uneven conformation or has a design thereon, and furthermore, the excessively thick coating of graphite often serves to chill the surface of the casting and render the subsequent machining thereof difficult.

Where thick, but lighter weight castings of medium surface area, but not extremely thin, are desired, it is often customary, where pattern-true castings are not essential, to dispense with slicking and to resort to a brushing operation wherein a camel's hair brush is employed to fill the interstices of the sand surface and to produce a polish thereon. In this latter method a much smaller quantity of graphite adheres to the mold and, due to the lesser cross sectional area of the casting, there is less need for such a heavy refractory layer than where larger heavy castings are being poured. The brushing operations are also expensive but, in many cases, because of the tendency to obliterate fine designs on the mold surface, cannot be employed.

Again, where thin, light, pattern-true castings are to be produced, but which because of their thinness require that the metal be hotter in order that the metal will run or penetrate to all portions of the mold, an exceedingly light layer of graphite is sometimes dusted on the mold from a shake-bag and slicking and brushing are dispensed with because the expense of such operations are usually greater than the cost of the removal of the fused sand embedded in the casting by mechanical and chemical means, such as by tumbling, sand blasting, and pickling. When such a dusting operation is employed, the graphite so applied tends to wash away in a large part before the flowing metal, unless all surplus dust is blown off and in such latter event, the residual dust remaining on the surface of the mold is ineffective to prevent the burning in of the sand, whereby serious losses are caused in the subsequent finishing operations employed to remove the sand from the casting.

In certain foundry operations it has also been customary to either employ special facing sands which had a certain proportion of bituminous coal, commonly known as sea coal, incorporated therein. In other cases where carbonaceous facings, such as finely powdered anthracite coal, coke dust, graphite or the like are dusted on the mold in an effort to produce a coating porous to the steam and gases on the sand surface thereof, a print-back operation, i. e. the return of the pattern to the mold following the dusting of facing material thereon to smooth out facing on the mold surface, is often employed, but the employment of special facings and the printback operation were often too expensive to warrant their use. Furthermore, where pattern-true molds are desired, a substantial portion of the mold is coated with a layer of a parting compound comprised of a highly waterproofed silicious base, which compound serves to effect the clean separation of the pattern from the sand surface of the mold. All attempts heretofore to cause a falling facing dust to adhere to such waterproofed superficial coatings or layers on such mold surfaces have been unsuccessful owing to the fact that the moisture absorbent ingredients which were used, such for example as fire-clay and soapstone, were incapable of drawing through the waterproofed surface the moisture actually required to insure the adhesion of the facing to such waterproofed mold surfaces.

My investigations have led to the discovery that in the production of light castings all of the principal objections above encountered in the industry can be substantially or entirely overcome and a pattern-true casting can be obtained that has a fine-grained, smooth surface, free from pits, pin holes and blow-holes, from which the adhering sand layer can be readily peeled without resorting to sand-blasting, tumbling and pickling operations, and without any washing, cutting, rat-tailing, chilling or hard spotting action occurring during the casting, by directly dusting upon the sand surface of the mold, following the removal of the pattern therefrom, of a carbonaceous facing material which has the inherent property of adhering tenaciously to said surface, whereby its displacement or movement under the action of the flowing metal is prevented. Moreover, as a result of the manner of application of the facing it is possible to fill the voids or interstices of the sand surface of the mold without any such disturbance, displacement or compacting of the surface sand particles as occur when a slicking tool or a brush is employed, whereby, as a consequence, the necessity for using special facing sands or special operations as slicking, brushing or printing-back is eliminated.

In order to produce a facing intended for the production of castings which are to be subsequently nickeled or enameled, which castings, besides the many requirements herein specified must have their surfaces entirely free of pits, that are generally caused by the accumulation or flocculating of small clusters of facing material on the mold surface which become embedded in the surface of the casting during the casting operation, I proposed to incorporate with a suitable carbonaceous dust, as for example graphite or plumbago (graphitic carbon) or a coke, such as coke breeze or gas retort carbon, what I term a de-clustering or deflocculating material, such for example as dextrine, gelatine, gum arabic and the like, the same being preferably admixed therewith prior to incorporating of bentonite, another essential ingredient, therewith. I preferably first prepare a dry mixture, comprising 100 parts of coke dust, of a fineness to pass through a 180 mesh screen, and 6 parts of dextrine, the two ingredients being intimately incorporated together in a dry state. Sufficient water is then added to moisten the mass, but insufficient to render the same sloppy, and the mixture is then heated to a temperature of about 212° F. with continuous stirring until the coke particles are thoroughly impregnated and coated with the dextrine solution and the mixture reduced to a dry dusty condition. The product is again ground and bolted to about 200 mesh and then about 20 parts of a colloidal clay-like material, as bentonite dust, for example, (preferably 180 to 200 mesh or finer) are incorporated in the mixture. The resultant product is then ground and bolted.

While I find the employment of a deflocculating agent in conjunction with the bentonite and carbonaceous base is highly desirable, nevertheless, for some purposes, a finely divided dry carbonaceous base, as graphite or plumbago, or coke, such as coke breeze or gas retort carbon, may be mixed dry with the dry colloidal clay-like material aforesaid, preferably in the proportion of about 100 parts of the carbonaceous dust base to about 20 parts of the bentonite or like highly colloidal clay-like material, although a smaller amount of bentonite, say as low as 10% or a larger amount, say as high as 40%, of bentonite may be employed without entirely losing or obliterating the facing value of the mixture or the peeling action and other advantages obtained by the employment of my first mentioned product, the results obtained therewith varying for different types of castings depending upon the pouring qualities of the metal, the pouring temperature, the thickness of the casting, etc.

The aforesaid bentonite-dextrine and carbonaceous base mixture or the bentonite and carbonaceous-base mixture, containing as they do a colloidal clay which has an especially high affinity for moisture, is capable of being dusted on the sand surface of the mold from a shake bag and such facing products, but especially the former, have the characteristic property of positively adhering to the damp sand of the mold surface with the consequence that such facing does not run before the metal and become washed off or displaced during the casting operation in such a manner as to cause the cutting, rat-tailing, cold-shutting (i. e. the enclosures of small heaps of facing in the metal) or other objectionable results frequently encountered heretofore and consequently functions as a refractory insulating layer which effectively withstands the action of the hot molten metal and serves to protect the mold against the erosive and burning and other deleterious actions thereof.

This new facing when dusted on sand molds, tends to absorb or draw out the superficial moisture therefrom thereby skin drying the mold, thus acting as a moisture-compensating medium, whereby a uniform surface is produced upon which the metal lays quietly, without substantial bubbling or frothing, since the steam, which remains beneath such tenacious refractory insulating facing layer, escapes through the permeable sand of the mold.

The aforesaid bentonite, as is well known, is a natural clay that contains a large percentage of aluminum hydrate and silicic acid (hydrated silica), together with impurities such as the oxides of iron, sodium and potassium. It has a high dye adsorption test (see in this connection the paper entitled "Dye Adsorption Test" in the transactions of the American Foundry Men's Association for May 1923). For example, the maximum dye adsorption figure of ordinary clays is but about 12,000 whereas bentonite has a minimum dye adsorption figure of about 25,000.

The bentonite or its equivalent which is present in the foregoing facing materials, whether containing dextrine or not, has a peculiar affinity for the relatively small percentage of moisture, about 4% to 8% which is ordinarily found in the sand surface of a mold used in the casting of iron and thereby the bentonite, or its equivalent serves, owing to such affinity for water, to continuously supply moisture to the facing composition thus softening the same and increasing the cementing action between the facing and the sand particles of the mold and especially serving when dextrine or like deflocculent is employed to render the latter tacky. Furthermore, the type of facing above described which contains dextrine or like deflocculent possesses decided advantages over the other type of facing for the production of castings which are to be subsequently nickeled or enameled.

While I prefer bentonite because of its availability and cheapness other colloidal clay-like materials have a dye-adsorption figure in excess of 15,000, such as the dry residue obtainable from processing feldspar after the removal of the alkali metal compounds therefrom, which residue contains aluminum hydrate and silicic acid in about the same proportions as bentonite and which has a high dye adsorption figure approaching bentonite and far well in excess of 15,000, being highly colloidal if same has been reduced to dryness at a low temperature without excessive dehydration thereof may, if capable of substitution for the aforesaid bentonite in the production of my improved facings, be employed without departing from the spirit of my invention.

While I preferably employ about six parts of dextrine or like deflocculent, I may, as above stated, reduce this percentage to the point where no dextrine at all is used or I may employ a very small amount, say 2% or 3% or even much larger amounts than 6%, but in no case more than 40% by weight of the mixture of coke and bentonite and dextrine or like deflocculent.

Various other changes within the scope of the appended claims may be made without departing from the spirit of my invention.

Having thus described my invention, what I claim is:

1. A facing composition for sand molds, comprising a dry mixture containing a major percentage of a carbonaceous dust, the particles thereof being coated with a deflocculating agent and being intimately mixed with a highly colloidal clay of the order of bentonite in its general characteristics and having a dye adsorption figure in excess of 15,000.

2. A facing composition for sand molds, comprising a dry mixture containing a major percentage of coke in a finely divided condition, the particles thereof being coated with a water soluble deflocculating agent and being admixed with bentonite.

3. A facing composition for sand molds, comprising a dry mixture containing a major percentage of a carbonaceous dust, the particles thereof being coated with a water soluble deflocculating agent and being admixed with a colloidal clay of the order of bentonite in its general characteristics and having a dye adsorption figure in excess of 15,000.

4. A facing composition for sand molds, comprising a dry mixture containing a major percentage of a carbonaceous dust, from 10 to 40% of a highly colloidal clay, having a dye adsorption figure in excess of 15,000 and said carbonaceous particles being impregnated with not exceeding 40% by weight of the mixture of a deflocculating agent capable of inhibiting the clustering of the carbonaceous particles when dusted onto a damp sand surface.

5. The method of making a facing composition for metal-casting sand molds, which consists in mixing together a relatively large quantity of carbonaceous dust with a relatively small quantity of deflocculating agent while the same are in a dry condition, then moistening the mixture, reducing the same to dryness, and adding an intermediate proportion of a highly colloidal clay having a dye adsorption figure in excess of 15,000 and finely comminuting the resultant mass.

6. The method of making a facing composition for metal-casting sand molds, which consists in mixing together a relatively large quantity of finely divided coke with a relatively small quantity of deflocculating agent while the same are in a dry condition, then moistening the mass with constant stirring, then reducing the mass to dryness, then adding an intermediate proportion of bentonite and finely comminuting the resultant mass.

7. A dry facing composition for metal-casting sand molds, comprising gas retort coke having a minor percentage of bentonite intimately admixed therewith, the mixture being in the form of a dry dust.

8. A facing composition for metal-casting sand molds, the same comprising a dry mixture containing principally carbon in a finely divided condition and having 10% to 40% by weight of the mixture of bentonite incorporated therewith.

9. A dry facing composition for metal-casting sand molds, the same consisting essentially of carbon in a finely divided condition and being impregnated and coated with a water-soluble agent capable of serving as a carbon de-clustering agent and the mixture containing a minor percentage of bentonite.

10. A facing composition for metal-casting sand molds, comprising a dry dust containing a major percentage of carbonaceous material and in excess of 15% of bentonite, said composition having the inherent capability of drawing sufficient moisture from the damp surface of a sand mold, containing but 8% moisture, to insure its tenacious adherence to such damp surface and the skin-drying of the mold and to thereby render it possible to apply to such damp surface, by a mere dusting operation and without necessitating the employment of a special facing sand or resorting to special cleaning operations as slicking, brushing and printing back, a layer of such facing composition which is capable of effectively resisting displacement by the flowing action of the molten metal and thereby producing a surface upon which the molten metal lays quietly and furthermore protecting the mold from erosion and burning-in actions of such metal, with the consequent production of a casting from whose surface the adhering sand can be readily peeled without necessitating sand blasting, tumbling or pickling to remove such adhering sand.

11. A facing composition for metal-casting sand molds, comprising a dry dust containing a major percentage of carbonaceous material, a minor percentage of a water-soluble substance adapted to unite with water to form an adhesive, and a minor percentage of bentonite, said composition having the inherent capability of drawing sufficient moisture from the damp surface of a sand mold, containing but 8% moisture, to insure its tenacious adherence to such damp surface and the skin-drying of the mold and to thereby render it possible to apply to such damp surface, by a mere dusting operation and without necessitating the employment of a special facing sand or resorting to special cleaning operations as slicking, brushing and printing back, a layer of such facing composition which is capable of effectively resisting displacement by the flowing action of the molten metal and thereby producing a surface upon which the molten metal lays quietly and furthermore protecting the mold from erosion and burning-in actions of such metal, with the consequent production of a casting from whose surface the adhering sand can be readily peeled without necessitating sand blasting, tumbling or pickling to remove such adhering sand.

12. A facing composition for metal-casting sand molds, comprising a dry dust containing a major percentage of carbonaceous material, a minor percentage of a water-soluble adhesive agent and a minor percentage of bentonite, the combined percentages of bentonite and water-soluble adhesive agent being not less than 12%, said composition having the inherent capability of drawing sufficient moisture from the damp surface of a sand mold, containing but 8% moisture, to insure its tenacious adherence to such damp surface and the skin-drying of the mold and to thereby render it possible to apply to such damp surface by a mere dusting operation, and without necessitating the employment of a special facing sand or resorting to special cleaning operations as slicking, brushing and printing back, a layer of such facing composition which is capable of effectively resisting displacement by the flowing action of the molten metal and thereby producing a surface upon which the molten metal lays quietly and furthermore protecting the mold from erosion and burning-in actions of such metal, with the consequent production of a casting from whose surface the adhering sand can be readily peeled without necessitating sand blasting, tumbling or pickling to remove such adhering sand.

BENJAMIN F. WALLACE.